United States Patent [19]

Quick et al.

[11] Patent Number: 4,640,152
[45] Date of Patent: Feb. 3, 1987

[54] MULTI-SPEED PLANETARY TRANSMISSION

[75] Inventors: David C. Quick, New Berlin; Stephen J. McCormick, Shorewood; Gerardus M. Ballendux, Waukesha, all of Wis.

[73] Assignee: Deutz-Allis Corporation, Milwaukee, Wis.

[21] Appl. No.: 734,545

[22] Filed: May 16, 1985

[51] Int. Cl.⁴ ............................................. F16H 57/02
[52] U.S. Cl. .................................... 74/767; 74/606 R
[58] Field of Search ................. 74/767, 766, 753, 705, 74/674, 606 R, 15.63

[56] References Cited

U.S. PATENT DOCUMENTS

| | | | |
|---|---|---|---|
| 2,799,184 | 7/1957 | Miller | 74/705 X |
| 3,548,666 | 6/1969 | Crooks | 74/705 X |
| 3,548,681 | 6/1969 | Crooks | 74/705 X |
| 3,739,647 | 6/1973 | Crooks | 74/705 X |
| 3,929,037 | 12/1975 | Marsch | 74/705 X |
| 4,019,406 | 4/1977 | Herr | 74/753 |
| 4,142,425 | 3/1979 | Ahlen et al. | 74/766 X |
| 4,361,059 | 11/1982 | Kronogard | 74/753 X |
| 4,559,848 | 12/1985 | Kerr | 74/753 X |

Primary Examiner—Leslie Braun
Assistant Examiner—Dwight G. Diehl
Attorney, Agent, or Firm—Charles L. Schwab

[57] ABSTRACT

A single axis multi-speed planetary transmission of the epicyclic type is provided in which a single rotating housing encloses and carries three epicyclic gear sets. Hollow end portions of the rotating housing are carried on a stationary housing by bearings and quill shafts extend from the end portions and are connected to brakes carried on the stationary housing. Two fluid operated clutches are provided within the rotating housing to selectively interconnect certain of the components of the epicyclic gear sets and together with the two brakes provide controls to effect one reverse and five forward speeds. The output shaft is a quill shaft and the input shaft extends through the transmission, and through the output shaft, to provide a power takeoff shaft at the output end of the transmission.

19 Claims, 9 Drawing Figures

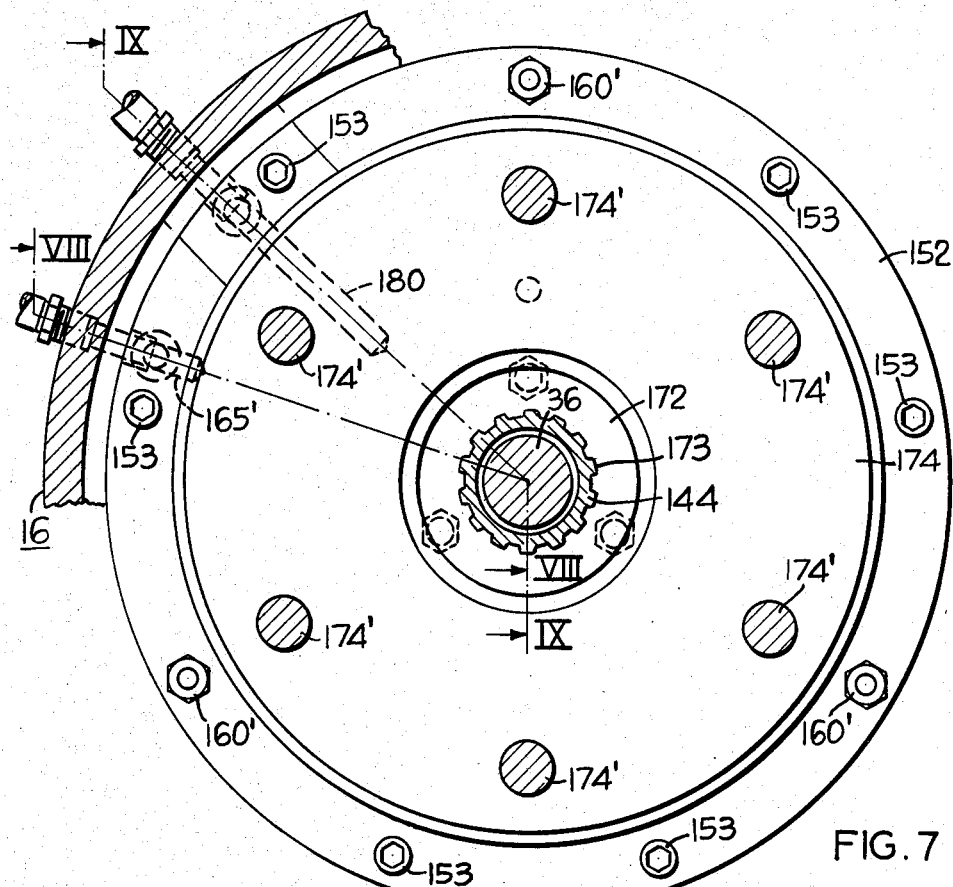
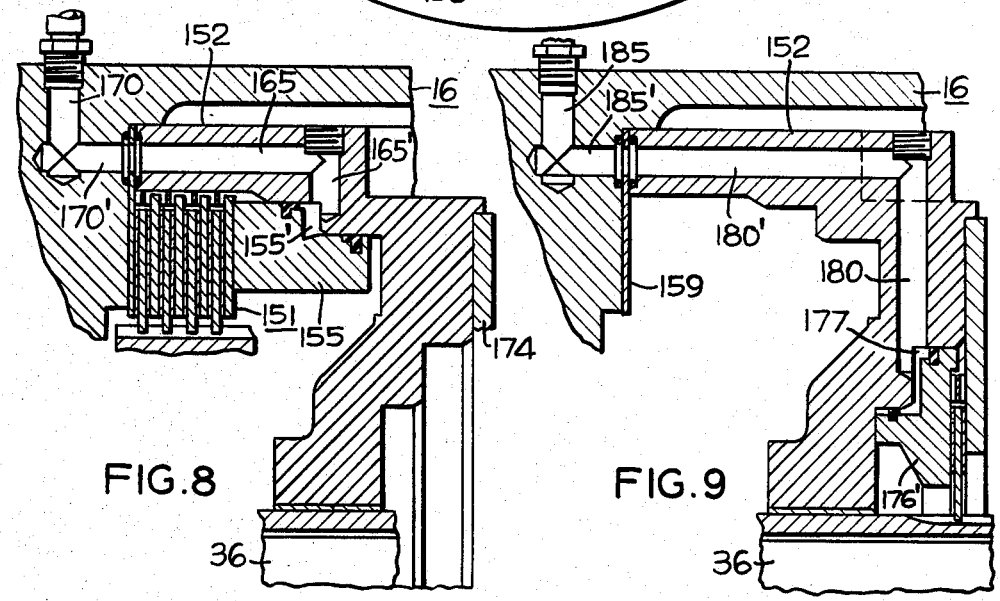
FIG. 7
FIG. 8 FIG. 9

MULTI-SPEED PLANETARY TRANSMISSION

BACKGROUND OF THE INVENTION

1. Technical Field

This invention relates to a multi-speed planetary transmission wherein a plurality of planetary sets are interconnected and controlled by brakes and clutches to achieve a plurality of forward speeds and at least one reverse speed.

2. Prior Art Statement

U.S. Pat. No. 3,722,300 issued to James W. Crooks on Mar. 27, 1973 for a "Power Shift Planetary Transmission" includes three epicyclic gear sets connected in series and controlled by two brakes and two clutches to obtain one reverse speed and five forward speeds. This single axis prior art transmission includes a rotating structure and epicyclic transmission components within the transmission housing which are supported on an input shaft. The rotating structure of this prior art transmission is of relatively large diameter and mass, thus requiring relatively high capacity clutches and brakes for stopping or starting rotational movement of the rotating components and requiring a strong input shaft to carry the load without substantial longitudinal deflection.

BRIEF DESCRIPTION OF THE INVENTION

The planetary transmission of this invention includes a stationary housing having an interior cavity and wall means defining bearing support portions with aligned circular openings at opposite ends of the cavity for receiving cylindrical hollow end portions of a rotating housing disposed within the cavity. The transmission has a single axis about which the rotating housing, input and output shafts and other major power transmitting components rotate and includes a plurality of planetary transmission sets arranged in sequence within the housing. The planetary sets are of the epicyclic type, each including a ring gear component, a sun gear component and a planet carrier component having a plurality of planet gears meshing with the sun and ring gear components. A pair of bearings rotatably mount the cylindrical end portions of the rotating housing on the bearing support portions of the stationary housing at the opposite ends of the cavity. An input shaft extends through the circular openings at the input and output ends of the stationary housing and through the hollow cylindrical end portions of the rotating housing. A brake carried by the stationary housing is operatively associated with a first component of the first gear set and a first clutch is operatively interposed between that first component and the rotatable housing. The axially inner end of the input shaft is connected for rotation with a second component of the first epicyclic gear set. A second clutch is operatively interposed between the rotating housing and the second component of said first gear set. A third component of the first gear set is connected for rotation with the first component of the second gear set. A second component of the second gear set is secured to the rotating housing and a third component of the second gear set is secured for rotation with a first component of the third gear set. A second component of the third gear set is secured to the rotating housing for rotation therewith and a third component of the third gear is operatively associated with a brake mounted on the stationary housing. The output shaft is connected for rotation with the first component of the third gear set. An important advantage of the present invention is the provision of a rigid rotating housing which is rotatably mounted at its opposite ends to the stationary housing, thus relieving the input shaft of the load it would otherwise be subjected to should the rotating housing be rotatably mounted on it. Supporting the rotating housing at its input end also provides a convenient location for a rotary fluid coupling for conveying pressure fluid to hydraulically operated clutches in the rotating housing. The output shaft may take the form of a quill shaft and the input shaft may extend through the output shaft to become a power takeoff shaft which is independent of power transmission by the output shaft. A bearing support structure may be provided at the input end of the stationary housing which includes spaced bearing support portions for mounting a first bearing for supporting one end of the rotating housing and a second bearing for supporting the input shaft. A space or cavity between the bearing support portions of the bearing support structure may serve to house the brake associated with the first component of the first gear set. Preferably, a relatively large opening is provided in the input end of the stationary housing for the mounting of the removable bearing support structure. Upon the bearing support structure being removed, the rotating housing may be passed through the large opening of the stationary housing for purposes of installation or removal. It is also preferred that the brakes and clutches of the transmission are hydraulically operable. The brake for the third component of the third gear set is preferably placed on the axially outer side of the bearing supporting the output end of the rotating housing in which event a quill shaft is used to connect such third element of said third gear set with the brake. This transmission provides five forward speeds, a reverse speed and a neutral condition, has compact single axis configuration and is relatively easy to manufacture, assemble and service.

BRIEF DESCRIPTION OF THE DRAWINGS

One embodiment of the invention is illustrated in the drawings in which:

FIG. 7 is a view taken along the line VII—VII in FIG. 4; and

FIG. 8 is a view taken along the line VIII—VIII in FIG. 7; and

FIG. 9 is a view taken along the line IX—IX in FIG. 7.

DETAILED DESCRIPTION OF THE DRAWINGS

Figure 1:
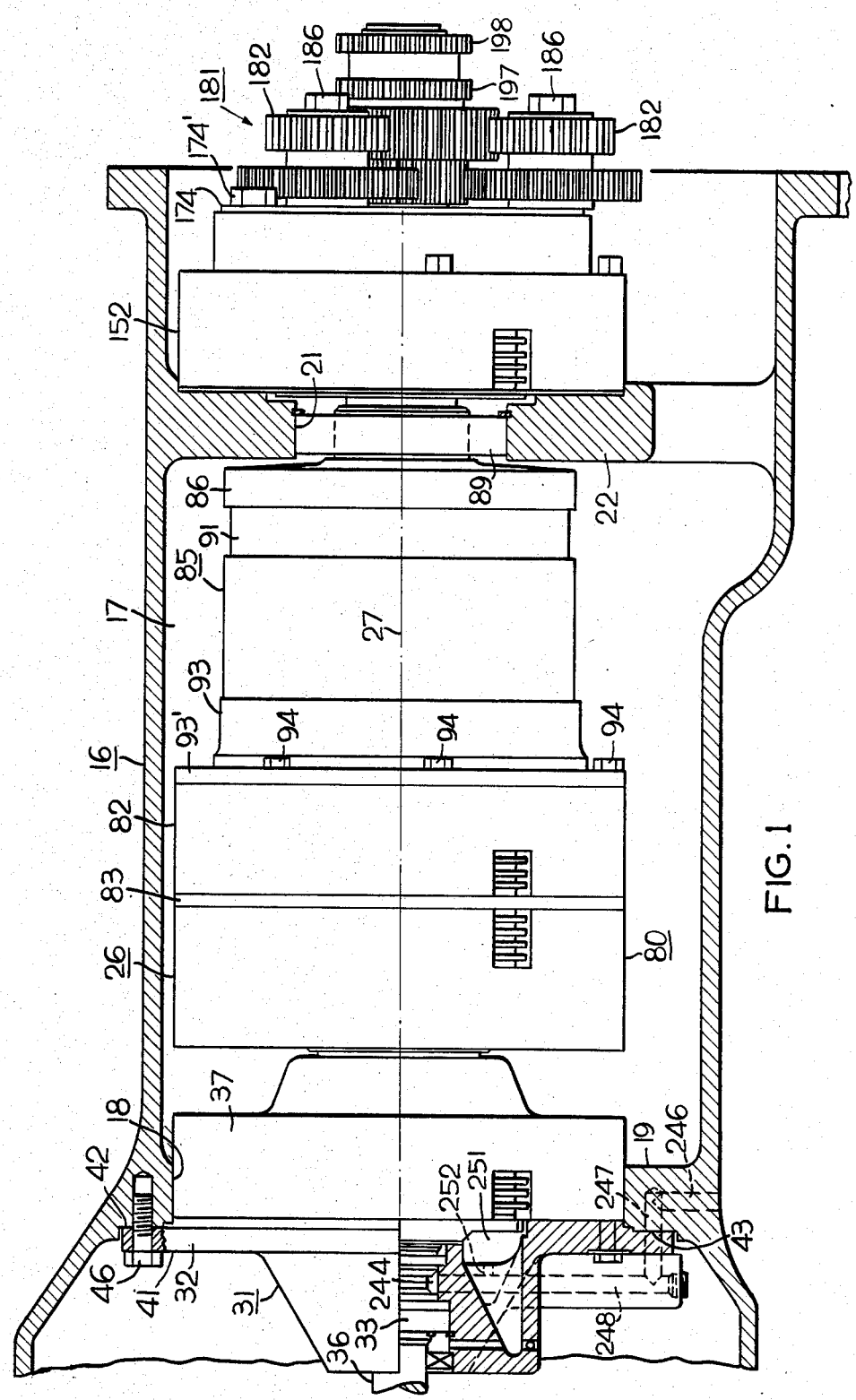
FIG. 1 is a partial section of the transmission.

Referring to FIG. 1, the stationary housing 16 is not only a transmission housing but it is also a structural part of the frame of a vehicle such as a farm tractor. The stationary transmission housing 16 includes wall means defining a large interior cavity 17. A rather large circular opening or aperture defined by cylindrical radially inward facing cylindrical surface 18 is presented by an interior wall 19 at the input end of the transmission housing 16 and a relatively small aperture or circular opening is defined by a radially inward facing cylindrical surface 21 on an interior wall 22 near the output end of the transmission housing 16. The interior cavity 17 between the interior walls 19 and 22 is sufficiently large to accommodate a rotating transmission housing 26 which is mounted at its axially opposite ends by antifriction bearings, in the interior walls 19 and 22, for rotation about an axis 27.

Figure 2:
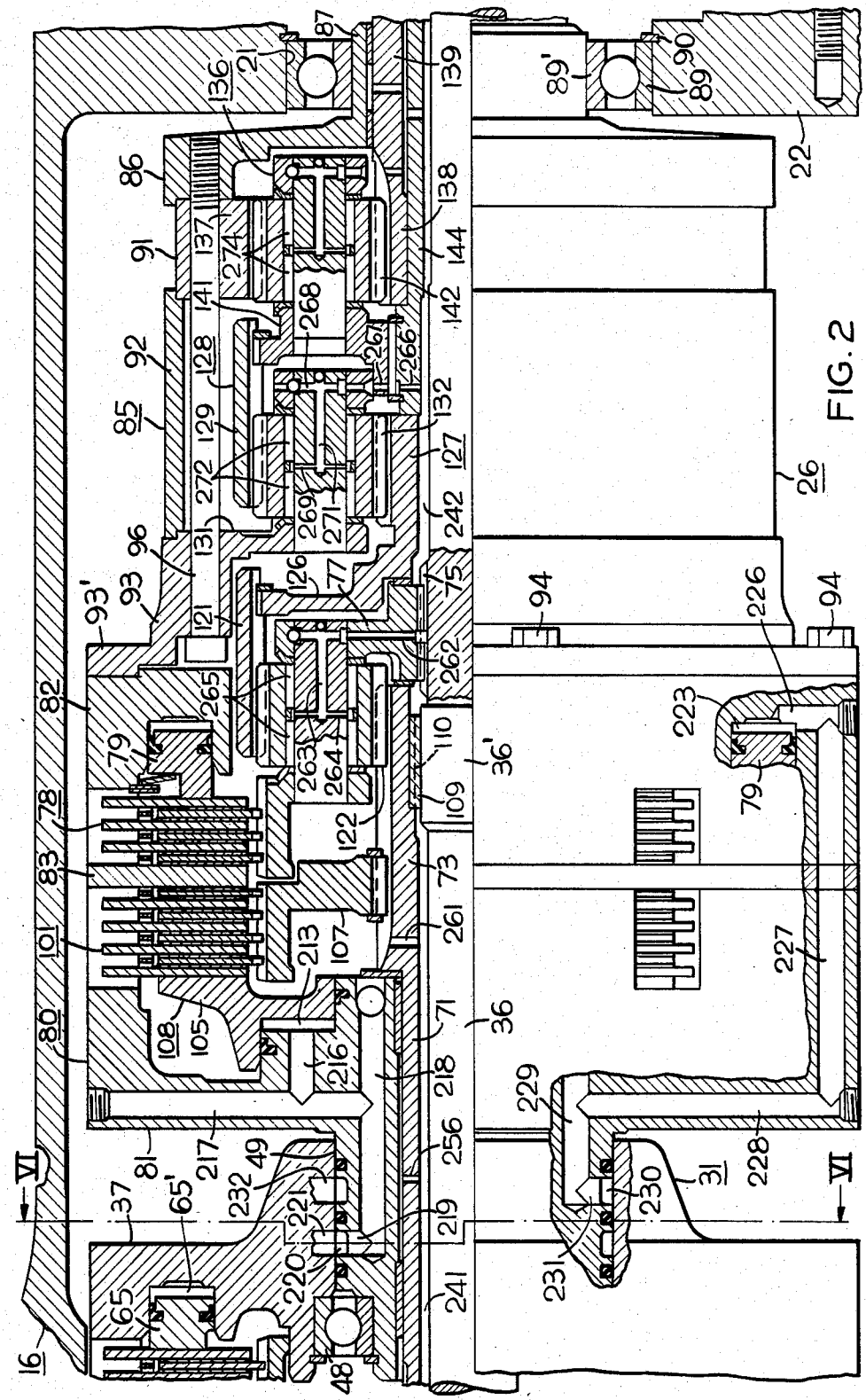
FIG. 2 is an enlarged partial section of the transmission illustrated in FIG. 1.
Figure 3:
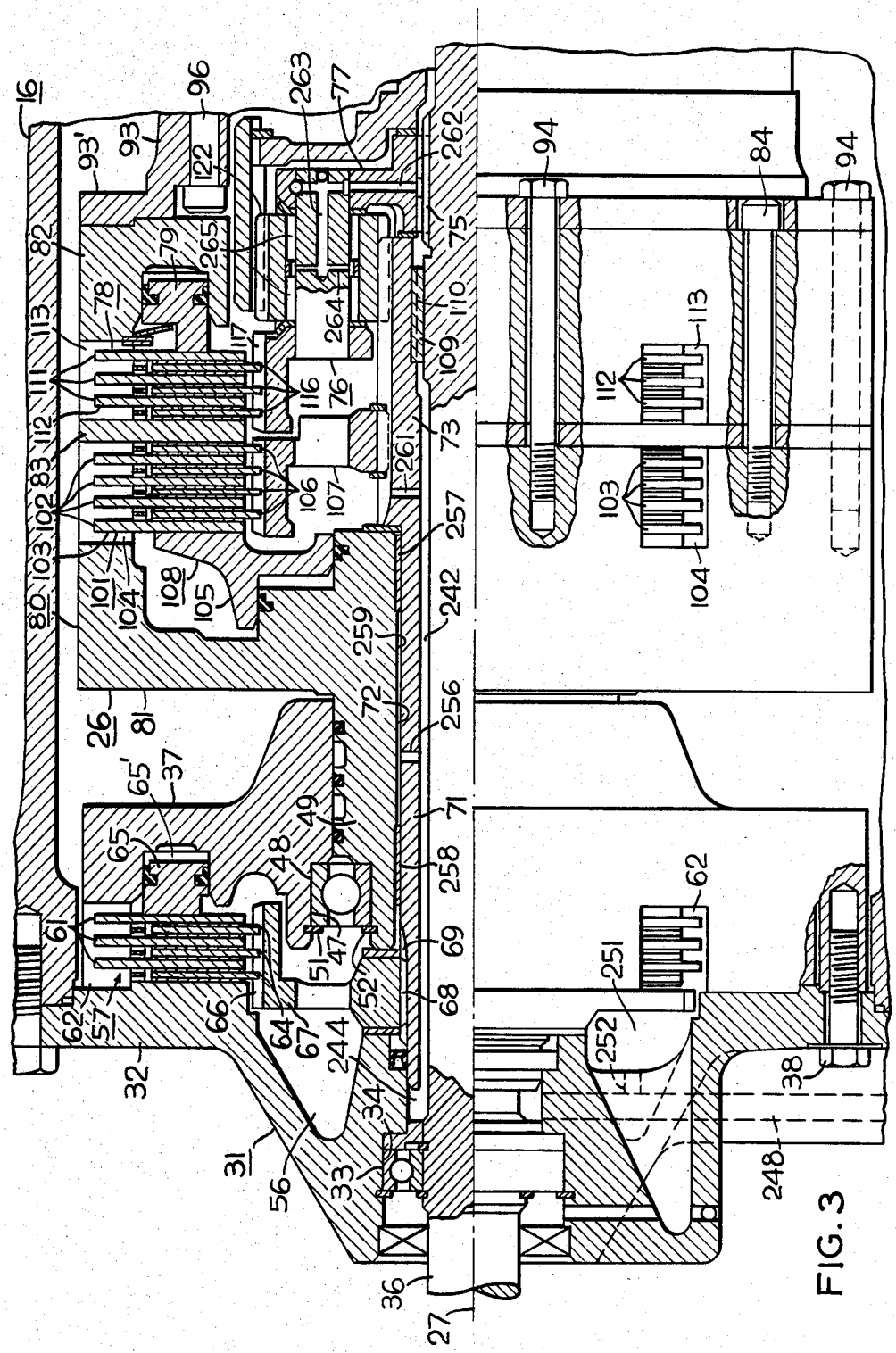
FIG. 3 is an enlarged partial section of the input end of the transmission illustrated in FIGS. 1 and 2.

Referring also to FIGS. 2 and 3, a bearing support structure 31 is made up of a first portion 32 presenting a cylindrical bore 34 in which an antifriction or ball bearing 33 is mounted and rotatably supports an input shaft 36 which is normally connected to the output or flywheel of any engine mounted at the front of the tractor. A second or rear portion 37 of the bearing structure 31 is releasably secured to the first or front portion 32 by cap screws 38. The bearing support structure 31 includes a radially outward extending flange 41 on the first portion 32 with an axially inward facing flat face 42 which is secured against a complementary flat face or surface 43 normal to the axis 27 on the input or axially outer side of the interior wall 19 by cap screws 46. As appears in FIG. 3, the axially inner portion 37 of the bearing support structure 31 includes a radially inward facing cylindrical surface 47 in which a ball bearing 48 is mounted. The antifriction bearing 48 rotatably supports a cylindrical end portion 49 on the input end of the rotatable housing 26 and snap rings 51 and 52 hold the rotatable housing 26 against axial movement relative to the stationary housing 16.

The bearing support structure 31 includes wall means defining an interior cavity 56 between the wall portions 32, 37 in which a multiple disc, hydraulically operated, brake 57 is positioned. The brake 57 includes a first set of discs 61 having radially outward extending tabs which fit into pockets or openings 62 in the periphery of the bearing support 37. Interleaved with the discs 61 are three discs 64 which are splined at their inner diameters to nonrotatably engage splines 66 on the outer circumference of a brake hub 67. A hydraulic actuator or piston 65 mounted in portion 37 engages the brake 57 when actuated by supplying pressure fluid to an annular chamber 65'. The brake hub 67 has radially inward facing teeth 68 which nonrotatably mesh with complementary splined teeth 69 formed on a quill shaft 71 which extends axially inwardly through an axial opening 72 in the rotating housing 26 and is rigidly connected to or integral with a sun gear component 73 of a first epicyclic or planetary gear set 76.

The planetary gear set 76 also includes a planet carrier component 77 which is splined to an externally splined portion 75 of the input shaft 36 and rotates therewith. The planet carrier component 77 may be selectively connected for rotation with the rotatable housing 26 by a hydraulically operated, multiple disc clutch 78 mounted within the rotatable housing 26 and including a hydraulic actuator 79. The clutch 78 includes a plurality of discs 111 with tabs 112 extending radially into peripheral openings 113 in the part 82 of the rotating housing 26 and cooperating discs 116 splined to an exterior spline or teeth 117 on the planet carrier 77.

The rotatable housing 26 includes a first subassembly 80 which includes an end part 81 on which the cylindrical end portion 49 is formed, an annular part 82 and a clutch spacing ring 83 between the parts 81, 82. The parts 81, 82, 83 of the subassembly 80 are secured together and held in assembly by a plurality of releasable fastening means in the form of cap screws 84. The rotating housing 26 also includes an annular subassembly 85 which includes an end part 86 having a hollow cylindrical end portion 87 rotatably supported on the radially inward facing cylindrical surface 21 of the interior wall 22 by an antifriction or ball bearing 89. The outer raceway of the ball bearing 89 is held against axially outward movement by a snap ring 90 installed in an annular groove in the wall 22. The inner raceway 89' is axially movable relative to the rotatable housing 26, that is, relative to cylindrical end portion 87. The subassembly 85 further includes a ring part 91, a cylindrical spacer part 92 and a flanged part 93. The parts 86, 91, 92 and 93 of the subassembly 85 are held in assembly by a plurality of releasable fastening means in the form of long cap screws 96. The two subassemblies 80 and 85 are rigidly but releasably secured to one another by releasable fastening means in the form of a plurality of cap screws 94 extending through openings in the flange 93' of part 93 and in parts 82 and 83 threadedly engaging threaded openings in part 80. Thus, the rotatable housing 26 is a series of parts fabricated as two subassemblies and constitutes a rigid structure by virtue of the parts being rigidly secured in assembly by cap screws 84, 94 and 96.

The sun gear component 73 on the quill shaft 71 is not only operatively associated with the brake 57 but is also selectively connected for rotation with or disconnected from the rotating housing 26 by a hydraulically operated disc clutch 101 operatively interposed between the rotating housing 26 and the sun gear component 73. The clutch 101 includes discs 102 with radially outward extending tabs 103 registering with peripheral openings 104 in the housing part 80 and cooperating discs 106 splined to a clutch hub 107 which in turn has a spline connection with the teeth of the sun gear component 73. The clutch 101 is actuated from its disengaged condition to an engaged condition by axial movement of an annular piston 105 of a hydraulic actuator 108. A bushing 109 is press fit into a bore at the axially inner end of the quill shaft 71 and rotatably supports the quill shaft 71 on an enlarged diameter portion 36' of the input shaft 36. Axial grooves 110 on the inner diameter of the bushing 109 permit the axial passage of lubricating fluid. Torque is transmitted from the carrier 77 to a ring gear component 121 by a plurality of circumferentially spaced planet gears 122 which mesh with the sun gear component 73 and the ring gear component 121. The internally toothed ring gear 121 is splined to a radially outward extending flange 126 of a sun gear component 127 of a second gear set 128 which also includes a ring gear component 129 and a planet carrier component 131 with a plurality of planet gears 132 meshing with the teeth of the ring gear component 129 and the sun gear component 127. The planet carrier component 131 is integral with the part 93 of the rotating housing 26. A third gear set 136 includes a ring gear component 137 which is integral with the rotating housing part 91, a sun gear component 138 formed on the axially inner end of a quill shaft 139 and a planet carrier component 141 having planet gears 142 meshing with the ring gear component 137 and the sun gear component 138. The planet carrier component 141 has a splined connection to the axially inner end of an output shaft 144 and also has a splined connection to the ring gear component 129 of the intermediate epicyclic gear set component 128. Thus, the ring gear component 129 and the planet carrier component 141 are secured for rotation with the output shaft 144.

Figure 4:
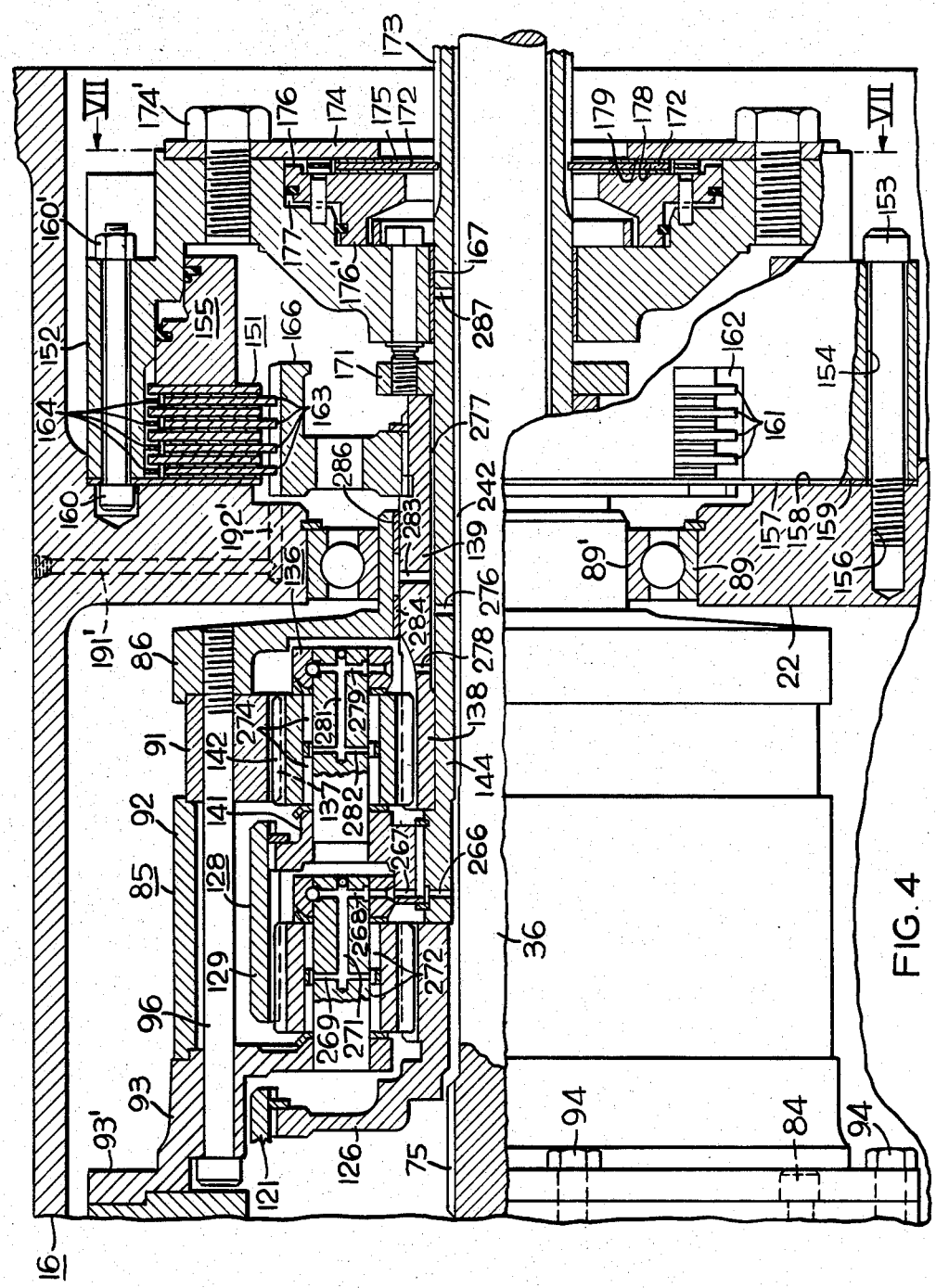
FIG. 4 is an enlarged partial section of the output end of the transmission illustrated in FIGS. 1 and 2.
Figure 5:
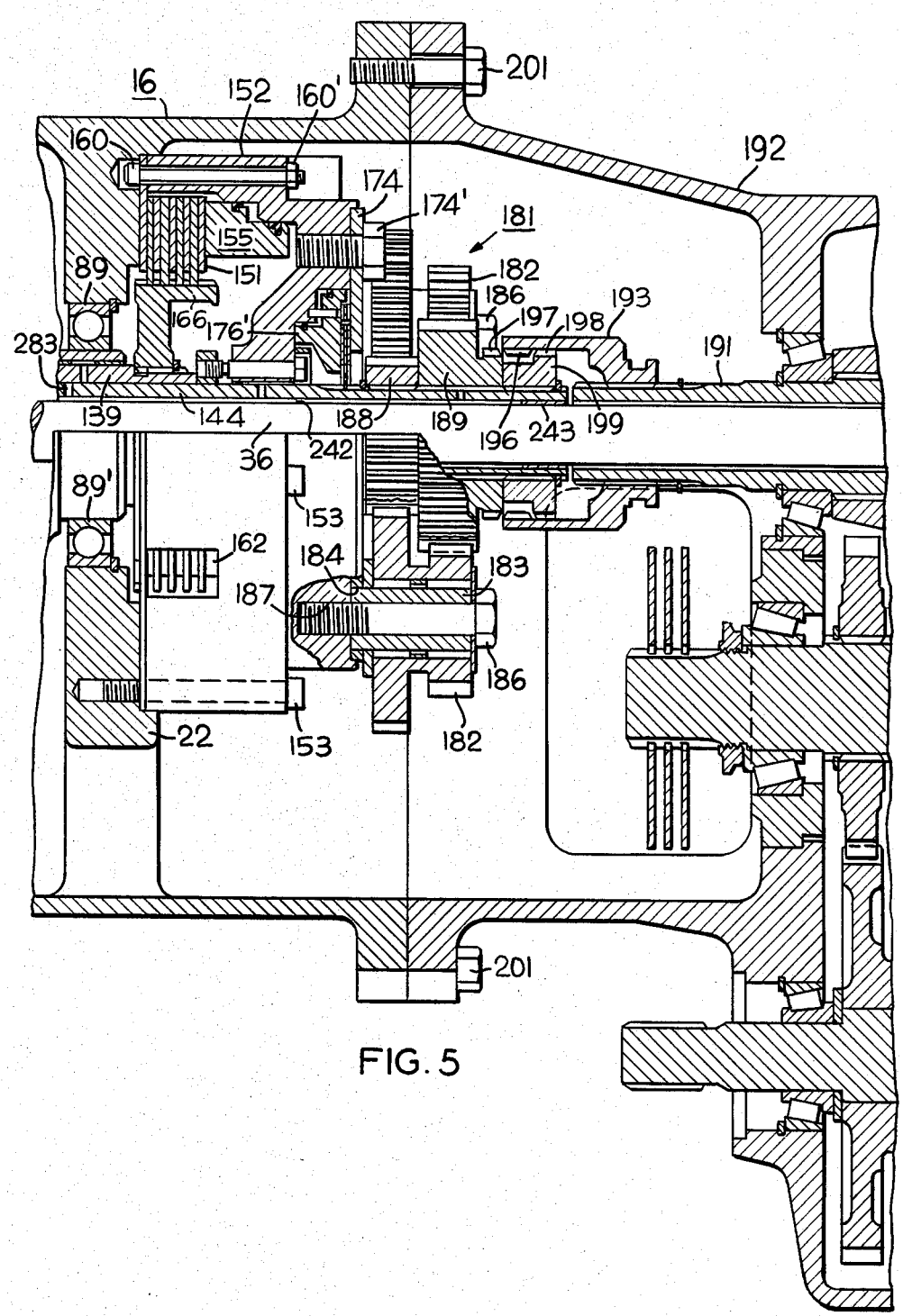
FIG. 5 is a section of the output end of the transmission and the input end of the final drive housing.

Referring to FIGS. 1, 4 and 5, a multiple disc hydraulic actuated brake 151 is operatively interposed between the quill shaft 139 and a brake support housing 152 releasably secured to the stationary transmission housing 16 by releasable fastening means in the form of cap screws 153 extending through axial openings 154 in the housing 152 and having threaded ends in threaded engagement with threaded openings 156 in the vertical wall 22 near the output end of the transmission housing 16. A flat annular washer or disc 157 is interposed between a flat vertical face 158 on the axially outer side of the wall 22 and a flat end face 159 on the axially inner end of the brake support housing 152. The disc 157 not only serves as a spacer and a stationary friction disc for the brake 151 but also serves to retain the brake discs 161, 163 and piston 155 in assembly by virtue of the disc 157 being secured to the brake housing 152 by bolts 160 and nuts 160'. The stationary discs 161 of the brake 151 have tabs extending radially outward into peripheral openings 162 in the brake housing 152. Annular spacer springs 164 urge the stationary discs 161 apart to a non-engaging position of adjustment. Rotating discs 163 of the brake 151 are interleaved with the stationary discs 161 and have their inner diameters splined to the teeth on the circumference of a brake hub 166. The bore of the brake hub 166 is splined to provide a spline fit with a spline formed on the axially outer end of the quill shaft 139. A bushing type bearing 167 rotatably supports the output quill shaft 144 intermediate its ends. As shown in FIGS. 7 and 8, a hydraulic brake actuator 151 includes an axially shiftable piston 155 which effects braking of the quill shaft 139 and its sun gear component 138 upon its chamber 155' being supplied pressurized fluid via passages 165, 165' in the brake housing 152 and passages 170, 170' in the stationary housing 16.

A transmission clearance adjusting device 171 is installed between the brake housing 152 and the axially outer end of the quill shaft 139.

As shown in FIGS. 4 and 5, the brake support housing 152 also supports a transmission output shaft brake 175 which includes a brake disc 172 whose inner bore is splined to external splines 173 on the outer diameter of the output shaft 144. The brake 175 also includes a stationary friction member in the form of an annular plate 174 and an axially shiftable piston 176' of a hydraulic brake actuator 176. When pressurized fluid is supplied to the chamber 177, the actuator or piston shifts axially so its flat surface 178 frictionally engages one side of the disc 172. The other axial side of the disc 172 frictionally engages a flat surface 179 on the axially inner side of the plate 174. As shown in FIGS. 7 and 9, pressurized fluid is supplied to the pressure chamber 177 for the piston 176' by passages 180, 180' in the brake housing 152 and passages 185, 185' in the stationary housing 16.

As shown in FIGS. 1 and 5, the brake housing 152 supports a range transmission 181 with cantilever supported planet gear clusters 182. Each of the three gear clusters 182 is mounted on the brake housing by a cantilevered cylindrical part or stub axle 183 which has its axially inner end in close fitting relation with a cylindrical surface 184 defining an axial opening in the flat annular plate 174. The plate 174 is releasably secured to the brake housing 152 by a plurality of cap screws 174'.

The stub axle 183 is rigidly secured to the brake housing by a cap screw 186 whose threaded end engages a threaded bore 187 in the brake support housing 152. A sun gear 188 splined to the output shaft 144 drives the planet clusters 182 which in turn drive an output sun gear 189 which is free to rotate relative to the output shaft 144. The input shaft 191 for a final drive housing 192 is connected, at the option of the operator, in torque receiving relation either to the output sun gear 189 or to the output shaft 144. This is achieved by shifting an axially shiftable clutch collar 193, splined to the input end of the shaft 191, to the left from its neutral or power disconnect position, as shown in FIG. 5, to a reduced speed power output position in which its internal teeth 196 engage the clutch teeth 197 on the sun gear 189 or by shifting the collar 193 to the right, as viewed in FIG. 5, so that its internal teeth 196 engage the external teeth 198 of a clutch collar 199 splined to the axially outer end of the output shaft 144. It will be noted that the stationary housing 16 is rigidly secured to the final transmission drive housing 192 by releasable fastening means in the form of cap screws 201.

Figure 6:
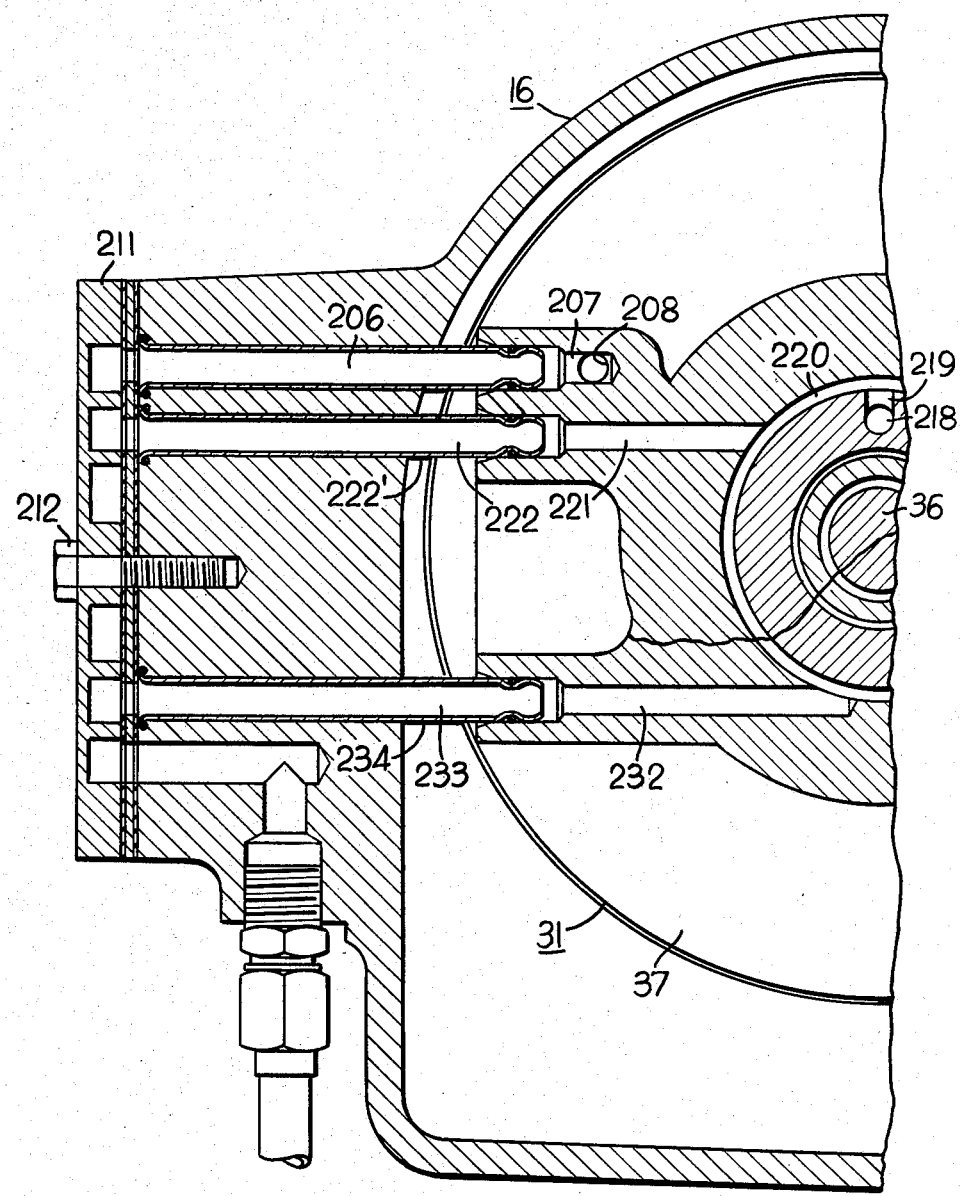
FIG. 6 is a view taken along the line VI—VI in FIG. 2.

Referring to FIGS. 2 and 6, pressurized fluid is delivered to a chamber 65' for the brake actuating piston 65 by way of a passage 206, in the stationary housing 16 and passages 207, 208 in the portion 37 of the bearing support structure 31. Pressurized fluid is supplied by way of a combined hydraulic manifold and control valve housing 211 secured to the transmission housing 16 by releasable fastening means such as cap screw 212.

Pressurized fluid is supplied to a chamber 213 for the hydraulic clutch actuator or piston 105 by passages 216, 217, 218, 219 and groove 220 in the rotation housing 26 and passages 221, 222 in the portion 37 of structure 31 and the connector tube 222'. A chamber 223 for the hydraulic clutch actuator or portion 79 is supplied pressurized fluid by way of passages 226, 227, 228, 229, 231 and annular groove 230 in the rotating housing, a passage 232 in part 37 and a passage 233 in a connector tube 234.

The bearings for the planet gears and other components are lubricated, and the clutches are cooled, by oil passing rearwardly through the passage 241 provided by the clearance between input shaft 36 and the quill shaft 71, through recesses 110 in bushing 109, through the spline connection between the planet carrier 77 and the spline 75 on the input shaft 36 and in the passageway 242 formed between the input shaft 36 and the sun gear 127 and the output shaft 144. As shown in FIG. 5, a bushing 243 in the end of the output shaft 144 closes off the end of passage 242.

As shown in FIGS. 1 and 3, oil is supplied to a chamber 244 at the front end of the passage by way of passages 246, 247, 248. A chamber 251 is supplied oil via passage 252 connected to passage 248 and oil flows from the chamber 251 to the brake discs 61, 64 to effect the desired cooling thereof. As shown in FIGS. 2 and 3, a branch passage 256 conveys lubricating oil to the bushings 257, 258 by which the quill shaft 71 is supported on the bore or opening 259 of the cylindrical end portion 49 of the rotating housing 26. A branch passage 261 discharges oil from passage 242 to cool the discs of clutches 101 and 78 and passages 262, 263, 264 direct oil from passage 242 to the bearings 265 for planet gears 122 of the front epicyclic gear set 76. As shown in FIGS. 2, 4 and 5, branch passages 266, 267, 268 269, 271 convey lubricating oil to the bearings 272 for the planet gears 132. Oil is conveyed to the bearings 274 for the planet gears 142 by a branch passage 276 in the output shaft 144, a clearance cavity 277 and branch passages 278, 279, 281, 282. A passage 283 in quill shaft 139 conveys oil to bearings in the form of bushings 284, 286 and a passage 287 in quill or output shaft 144 conveys oil to the bushing type bearing 167 between the output shaft 144 and the brake housing 152. As shown in FIG. 4, the discs of the rear brake 151 are cooled by oil pumped through passages 191, 192 in the housing 16.

OPERATION

The change speed transmission of this invention is controlled by hydraulically actuated brakes 57 and 151 and hydraulically actuated clutches 101 and 78 to provide five speeds forward and one reverse.

The following chart shows the engaged condition of the brake or clutch with an X and the disengaged condition with a blank space:

|         | Brakes |     | Clutches |    |
|---------|--------|-----|----------|-----|
| Speed   | 57     | 151 | 101      | 78  |
| Reverse | X      |     | X        |     |
| 1       |        | X   | X        |     |
| 2       | X      | X   |          |     |
| 3       |        | X   |          | X   |
| 4       | X      |     |          | X   |
| 5       |        |     | X        | X   |

The transmission is in neutral when none of the brakes and clutches is engaged and also when not more than one of the brakes and clutches is engaged.

The embodiments of the invention in which an exclusive property or privilege is claimed are defined as follows:

1. A single axis planetary change speed transmission comprising:

a stationary housing having wall means defining a hollow interior chamber including interior walls at opposite ends of said chamber defining a pair of axially spaced circular apertures disposed on said axis, a rotatable housing having wall means defining an interior cavity and presenting hollow cylindrical end portions at its opposite ends and in constant rotation therewith, a pair of bearing means rotatably mounting said end portions in said apertures, respectively, said end portions presenting openings, respectively, aligned on said axis, an input shaft coaxial with and extending through said opening in one of said end portions of said rotatable housing, first, second and third coaxial and axially spaced epicyclic gear sets operatively arranged in sequence within said cavity each including a ring gear component, a sun gear component and a planet carrier component rotatably supporting planet gears meshing with said ring and sun gear components, a first quill shaft encompassing said input shaft and having a central portion extending through said opening in said one of said end portions and presenting an axially inner end connected for rotation with a first of said components of said first gear set, means connecting said input shaft to a second of said components of said first gear set for rotation therewith and transmission of torque thereto, means connecting a third of said components of said first gear set in torque transmitting relation with a first of said components of said second gear set, means securing a second of said components of said second gear set to said rotatable housing for rotation therewith, means connecting a third of said components of said second gear set to a first of said components of said third gear for transmission of torque thereto and rotation therewith, means connecting a second of said components of said third gear set to said rotatable housing for rotation therewith, a second quill shaft having one end connected for rotation with a third of said components of said third gear set, and a central portion extending coaxially through the opening in the other of said cylindrical end portions of said rotatable housing, an output shaft coaxial with and extending through said second quill shaft having an axially inner end connected for torque transmitting rotation with said first component of said third gear set, a first brake operatively associated with the axially outer end of said first quill shaft and said stationary housing and having engaged and disengaged conditions of adjustment in which said first component of said first gear set is, respectively, secured to and released from said stationary housing, a second brake on said housing outside of said chamber operatively associated with said stationary housing and the other end of said second quill shaft and having engaged and disengaged positions of adjustment in which said second quill shaft is, respectively, secured to and released from said stationary housing, a first clutch in said rotatable housing operatively associated with the latter and said first component of said first gear set and having engaged and disengaged positions of adjustment in which the latter is, respectively, connected for rotation with and disconnected from said rotatable housing, a second clutch in said rotatable housing operatively associated with the latter and said second component of said first gear set and having engaged and disengaged conditions of adjustment in which said second component of said first gear set is, respectively, connected for rotation with and disconnected from said rotatable housing and said output shaft providing a reverse drive when said first brake and said first clutch are engaged and said second brake and said second clutch are disengaged, a first forward drive when said second brake and said first clutch are engaged and said first brake and second clutch are disengaged, a second forward drive when said brakes are engaged and said clutches are disengaged, a third forward drive when said second brake and said second clutch are engaged and said first brake and said first clutch are disengaged, a fourth forward drive when said first brake and said second clutch are engaged and said second brake and said first clutch are disengaged, and a fifth forward drive when said clutches are engaged and said brakes are disengaged.

2. The transmission of claim 1 wherein said output shaft is a quill shaft and said input shaft extends through said output shaft to serve as a power takeoff shaft.

3. The transmission of claim 1 wherein said bearing means includes a first antifriction bearing rotatably supporting said one end portion of said rotatable housing on said stationary housing including means preventing relative axial movement between said rotatable housing and said stationary housing and a second antifriction bearing rotatably supporting said other end portion of said rotatable housing on said stationary housing and including means permitting relative axial movement between said stationary housing and said other end portion.

4. The transmission of claim 1 and further comprising a bearing on said stationary housing supporting said input shaft, said bearing being spaced axially from said one end portion of said rotatable housing and wherein said first brake is positioned axially between said bearing and said bearing means rotatably mounting said rotatable housing on said stationary housing.

5. A single axis planetary change speed transmission comprising:
   a stationary housing including wall means defining a large interior cavity including axially spaced interior walls presenting, respectively, a large circular opening at the input end of said housing and a relatively smaller circular opening at the output end, said circular openings being aligned on said single axis of said transmission,
   a flat mounting surface normal to said axis on the axially outer side of said wall presenting said large circular opening,
   an annular bearing support structure including a radially outward extending flange in axial engagement with said flat mounting surface and a radially inward facing circular surface defining a bearing receiving opening,
   releasable fastening means rigidly securing said bearing support to said stationary housing,
   an annular rotatable housing disposed within said cavity having an interior chamber and hollow cylindrical end portions and in constant rotation therewith, the outside diameter of said rotatable housing being less than the interior diameter of said large circular opening,
   a first bearing operatively mounted in said bearing receiving opening and rotatably supporting one of said end portions on said axis,
   a second bearing operatively mounted in said circular opening at the output end of said stationary housing and rotatably supporting the other of said end portions on said axis,
   first, second and third epicyclic gear sets arranged in series within said rotatable housing and each including a ring gear component, a sun gear component and a planet carrier component having a plurality of planet gears operatively meshing with said ring gear and sun gear components,
   an input shaft rotatably supported by said bearing support structure extending through said one end portion of said rotatable housing and connected for rotation with a first of said components of said first gear set, and
   an output shaft connected for rotation with a first of said components of said third gear set and extending through the other of said end portions of said rotatable housing.

6. The transmission of claim 5 wherein said output shaft is a quill shaft and said input shaft extends therethrough to provide a power takeoff drive.

7. The transmission of claim 5 and further comprising a braking quill shaft surrounding said output shaft and extending through the other end portion of said rotatable housing having an axially inner end secured for rotation with a second component of said third gear set, a flat mounting face formed normal to said axis on the axially outer side of said interior wall at the output end of said stationary housing, a brake housing including an interior chamber, means rigidly securing said brake housing to said flat face and a selectively engageable and disengageable brake mounted in said brake housing and operatively associated with the other end of said braking quill shaft whereby said braking quill shaft may be held against rotation and released for rotation upon engagement and disengagement, respectively, of said brake.

8. The transmission of claim 7 wherein said output shaft is a quill shaft and said input shaft extends therethrough to provide a power takeoff drive independent of said output shaft.

9. The transmission of claim 5 and further comprising a third bearing supporting said input shaft on said bearing support structure on said axis, said third bearing being spaced from said first bearing in an axial direction toward said input end of said stationary housing, said bearing support having wall means defining a brake receiving cavity and further comprising a quill shaft surrounding said input shaft having one of its ends connected to a second of said components of said first gear set and a brake within said brake receiving cavity operatively associated with said bearing support structure and the other end of said quill shaft and having engaged and disengaged positions of adjustment in which said quill shaft is held against rotation and released, respectively.

10. A single axis transmission comprising:
    a stationary housing having an input end and an output end and walls defining a hollow interior chamber between said ends, said stationary housing having interior walls presenting circular openings on said axis at the input and output ends of said chamber at which annular bearing surfaces are formed on said axis,
    a rotatable housing having walls defining an interior cavity and having bearing portions at its opposite ends and in constnt rotation therewith,
    bearing means supporting said bearing portions on said circular bearing surfaces for rotation on said axis, said bearing portions being aligned on said axis and presenting axially aligned openings,
    first, second and third epicyclic gear sets sequentially arranged on said axis within said cavity of said rotatable housing, each of said gear sets having a ring gear component, a sun gear component and a planet carrier component rotatably carrying planet gears meshing with the sun and ring gear components,
    a first quill shaft having a central portion extending through one of said openings of said rotatable housing presenting a first end within said cavity connected for rotation with a first of said components of said first gear set and having a second end on the outside of said cavity, a brake operatively associated with said stationary housing and said second end of said quill shaft and selectively engageable to prevent rotation of said first component of said first gear set, means connecting a second of said components of said first gear set to a first of said components of said second gear set so as to rotate therewith, an input shaft extending through and coaxial with said first quill shaft having an axially inner end drivingly connected to a third of said components of said first gear set, means connecting a second of said components of said second gear set to a first of said components of said third gear set so as to rotate therewith, a second quill shaft having a first end connected to a second of said components of said third gear set, an intermediate portion extending through the other of said openings in said rotatable housing and a second end on the outside of said cavity, a brake operatively associated with said stationary housing and said second component of said third gear set having engaged and disengaged conditions of adjustment in which said second component of said third gear set is prevented from rotating and permitted to rotate, respectively, an output shaft connected for rotation with said first component of said third gear set and having a portion extending through said second quill shaft; and means securing the third component of two of said gear sets to said rotatable housing for rotation therewith, and a selectively engageable and disengageable clutch device operatively interposed between the third component of the other of said gear sets and said rotatable housing.

11. The transmission of claim 10 wherein said clutch device is operatively interposed between said third component of said first gear set and said rotatable housing.

12. The transmission of claim 10 and further comprising a clutch operatively associated with said rotatable housing and said first component of said first gear set and having engaged and disengaged conditions of adjustment whereby said first component of said first gear set is, respectively, connected for rotation with and released from rotation with said rotatable housing.

13. The transmission of claim 12 wherein said clutch device is operatively interposed between said third component of said first gear set and said rotatable housing.

14. The transmission of claim 13 wherein said clutch and clutch device are operated by hydraulic actuators, respectively, on said rotatable housing.

15. The transmission of claim 14 wherein said brakes are operated by hydraulic actuators on said stationary housing.

16. The transmission of claim 10 wherein said output shaft is a quill shaft and wherein said input shaft extends through said gear sets and said output shaft to provide a live power takeoff shaft at the output end of the transmission.

17. A single axis planetary transmission comprising:

a stationary housing having an input end and an output end and walls defining a hollow interior chamber between said ends, a rotatable housing having walls defining an interior cavity and having bearing portions at its opposite ends and in constant rotation therewith, bearing means supporting said bearing portions on said input and output ends, respectively, of said stationary housing for rotation on said axis, said bearing portions being aligned on said axis and presenting axially aligned openings, first, second and third epicyclic gear sets cooperatively arranged on said axis within said cavity of said rotatable housing, each of said gear sets having a ring gear component, a sun gear component and a planet carrier component rotatably carrying planet gears meshing with the sun and ring gear components, a brake operatively associated with said stationary housing and a first of said components of said first gear set and selectively engagable to prevent rotation of said first component of said first gear set, means connecting a second of said components of said first gear set to a first of said components of said second gear set so as to rotate therewith, an input shaft extending through said opening in one of said bearing portions and drivingly connected to a third of said components of said first gear set to rotate therewith on said axis, means connecting a second of said components of said second gear set to a first of said components of said third gear set so as to rotate therewith, a brake operatively associated with said stationary housing and said second component of said third gear set having engaged and disengaged conditions of adjustment in which said second component of said third gear set is prevented from rotating and permitted to rotate, respectively, an output shaft connected for rotation on said axis with said second component of said second gear set and having a portion extending through said opening in the other of said bearing portions, means securing the third component of said second and third gear sets to said rotatable housing for rotation therewith, and a selectively engagable and disengagable clutch device operatively interposed between the third component of said first gear set and said rotatable housing.

18. The transmission of claim 17 and further comprising a clutch operatively associated with said rotatable housing and said first component of said first gear set and having engaged and disengaged conditions of adjustment whereby said first component of said first gear set is, respectively, connected to and released from said rotatable housing.

19. The transmission of claim 18 wherein said output shaft is a quill shaft and wherein said input shaft extends through said gear sets and said output shaft to provide a live power takeoff shaft at the output end of the transmission.

* * * * *